L. BRAUER.
Omnibus Register.

No. 20,986.  Patented July 27, 1858.

UNITED STATES PATENT OFFICE.

LOUIS BRAUER, OF WASHINGTON, DISTRICT OF COLUMBIA.

OMNIBUS-REGISTER.

Specification of Letters Patent No. 20,986, dated July 27, 1858.

*To all whom it may concern:*

Be it known that I, LOUIS BRAUER, of Washington, District of Columbia, have invented an Improvement in Omnibus-Registers, and that the following is a full, clear, and exact description of the principle or character which distinguishes it from all other things before known and of the usual manner of making, modifying, and using the same, reference being had to the accompanying drawings, of which—

Figure 1:
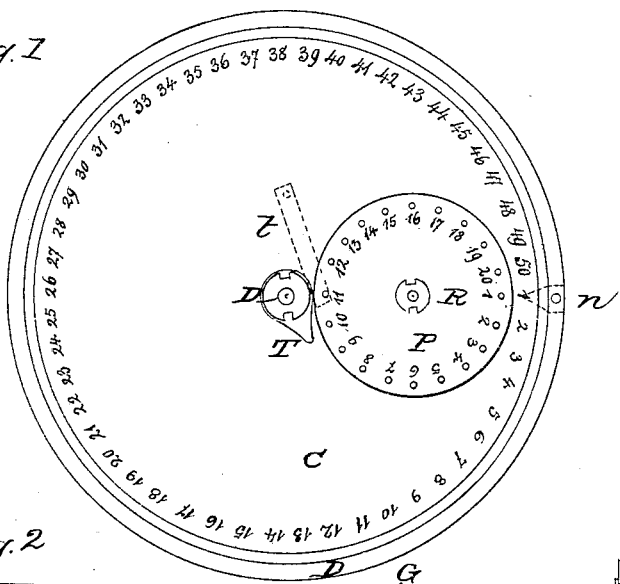
Figure 2:
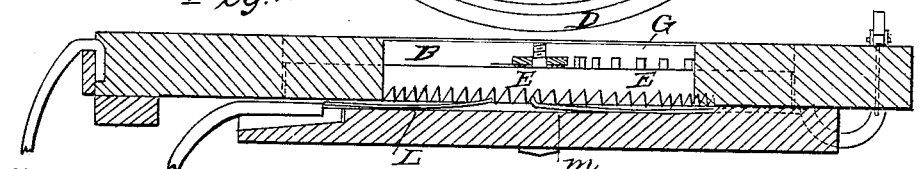
Figure 4:
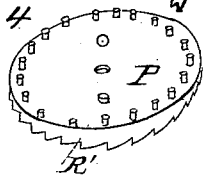
Figure 3:
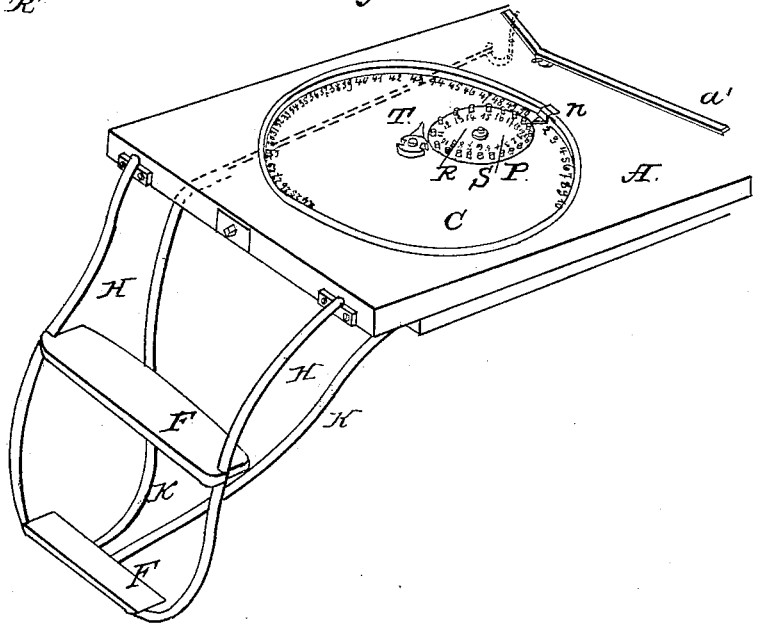

Figure 1, is a plan of the indicator; Fig. 2, a longitudinal section through the floor of the omnibus; Fig. 3, a perspective of the step and indicator; Fig. 4, a detached view of the count wheel.

My invention consists in an improvement in omnibus registers whereby the weight of a passenger on the step is made to operate the indicator or register by means represented and described as follows.

A, represents the floor of the omnibus and B a circular depression in the same in which is placed the indicator or register plate C. This plate turns around the fixed center-pin D. The indicator plate has at its periphery on the lower face, teeth E and is operated as follows. The steps F are hung from the frame of the omnibus by elastic rods H which yield sufficiently to the weight of a person to push the rods K forward, and through the action of springs L attached to rods K, revolve the indicator through the space of one tooth. The spring pawl or detent $m$ holds the indicator at the point to which it has been turned and as soon as the weight of the passenger is removed from the step the elasticity of the rods H brings the step back to its normal position and draws the spring L forward so as to be ready to operate against another tooth, the springs L having their points slightly turned up so as to strike the vertical edge of the tooth.

There are fifty divisions on the indicator plate and one hundred teeth so that a person going in and out being twice on the step will move the plate through the space of one division.

$n$, is a fixed index finger to show the number of movements of the indicator.

For the purpose of indicating high numbers I employ an extra-count-wheel P inserted in the face of the indicator and operated as follows. This count-wheel revolves about a pin R fixed to the indicator and has upon its upper face twenty divisions and twenty pins $s$. Fixed to the center pin D is a little projection or cam T and as the count-wheel is carried around with the indicator one of its pins will strike against the projection T and cause the count-wheel to move through the space of one division. The count-wheel will indicate therefore one thousand passengers. The count-wheel has upon its periphery ratchet teeth R′, and attached to the indicator is a spring pawl $t$ to prevent the wheel from being turned backward. The indicator is to be covered up by a suitable cap which is locked by the omnibus proprietor so as not to be accessible to the driver or other person. A signal bell is also placed somewhere near the driver so that each motion of the step shall ring the bell, this is done by connecting the bell hammer with the rod $a'$ which is operated by means of a wire or other suitable connection with the step rod K.

I do not claim moving the indicator of a register by pressure upon the steps but I do claim—

The employment of an elastic step by means of the movable rods K K for operating the register plate and bell in the manner set forth.

LOUIS BRAUER.

Witnesses:
CHAS. G. PAGE,
R. S. CAMPBELL.